July 5, 1960 L. C. BENTLEY 2,943,531
PHOTOELECTRIC INSPECTION APPARATUS
Filed Feb. 14, 1958 2 Sheets-Sheet 1
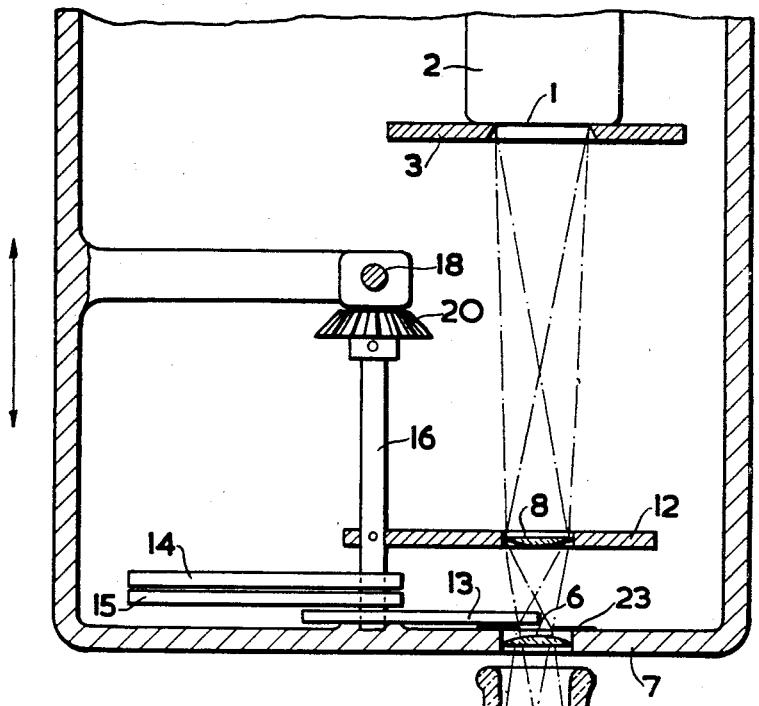
FIG. I.
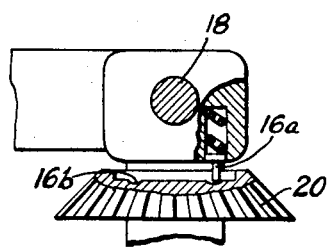
FIG. 3
INVENTOR
LAWRENCE C. BENTLEY
BY July 5, 1960 L. C. BENTLEY 2,943,531
PHOTOELECTRIC INSPECTION APPARATUS
Filed Feb. 14, 1958 2 Sheets-Sheet 2

INVENTOR
LAWRENCE C. BENTLEY
BY

United States Patent Office 2,943,531
Patented July 5, 1960

2,943,531

PHOTOELECTRIC INSPECTION APPARATUS

Lawrence Cranmer Bentley, Keston, England, assignor to U. D. Engineering Company Limited, London, England, a corporation of Great Britain Filed Feb. 14, 1958, Ser. No. 715,439

Claims priority, application Great Britain Feb. 20, 1957

8 Claims. (Cl. 88—14)

This invention relates to photoelectric inspection apparatus suitable for examining transparent containers for contamination and has for its object the provision of an improved form of such apparatus which is readily adaptable to examine containers of one or other of a number of different sizes. The invention has particular application to the examination of glass bottles and jars for contaminant substances or objects but may also find application in other fields.

In known apparatus for the photoelectric inspection of transparent containers an image of a scanning light spot moving so as to pass in turn over all parts of an area of appropriate shape is formed upon the inner surface of the bottom of the container. Light rays from said image passing through the container are received by light-sensitive means which responds to variations in illuminaton to yield an indication of any contamination encountered by the scanning light spot.

While the basic principles of such inspection apparatus are simple, in adapting the apparatus for examining a number of containers of different sizes difficulties arise in changing the optical system of the apparatus to ensure that the image of the light spot scanning said predetermined area is cast on the bottoms of the containers of different sizes without the necessity of providing for each size of container an expensive separate optical device or system the adjustment of which to suit different sized containers can be a lengthy procedure.

The main object of the present invention is to provide an inspection apparatus for examining transparent containers which is inexpensive to manufacture and can be quickly adjusted to suit the size of containers to be examined.

According to the present invention there is provided photoelectric inspection apparatus for examining transparent containers, comprising scanning means for generating a light spot moving to scan all parts in turn of a predetermined area, an optical device for imaging the light rays from said spot upon a transparent surface of a transparent container to be examined disposed in the apparatus for examination and a light-sensitive device disposed to receive light rays from said spot passing axially through said container and through said surface, said optical device having a first lens fixed in the path of said light rays from said predetermined area to the light sensitive device and a plurality of auxiliary lenses each arranged to be introduced selectively into said path in accordance with the size of container to be examined.

Where the containers to be examined are bottles or similar narrow-mouthed vessels, it is advantageous to arrange that said scanning means and the auxiliary lenses may be moved together in relation to containers to be inspected so that the said area is imaged by the optical device onto all parts of said container surfaces unobstructed by the walls of the containers.

By using a first lens continually in use and a plurality of additional lenses, the first lens can be of high optical precision and the auxiliary lenses can be of less accurate construction thereby greatly reducing the cost of manufacture and simplifying the use of the optical device.

In order that the present invention may be more clearly understood one embodiment in accordance therewith will now be described by way of example with reference to the accompanying drawings in which:

Figure 1 is a diagrammatic sectional side elevation of part of photoelectric inspection apparatus including a scanning device;

Figure 3 is a fragmentary view showing the detent means for properly positioning the blades.

The same parts are designated by the same references in both figures.

Figure 2:
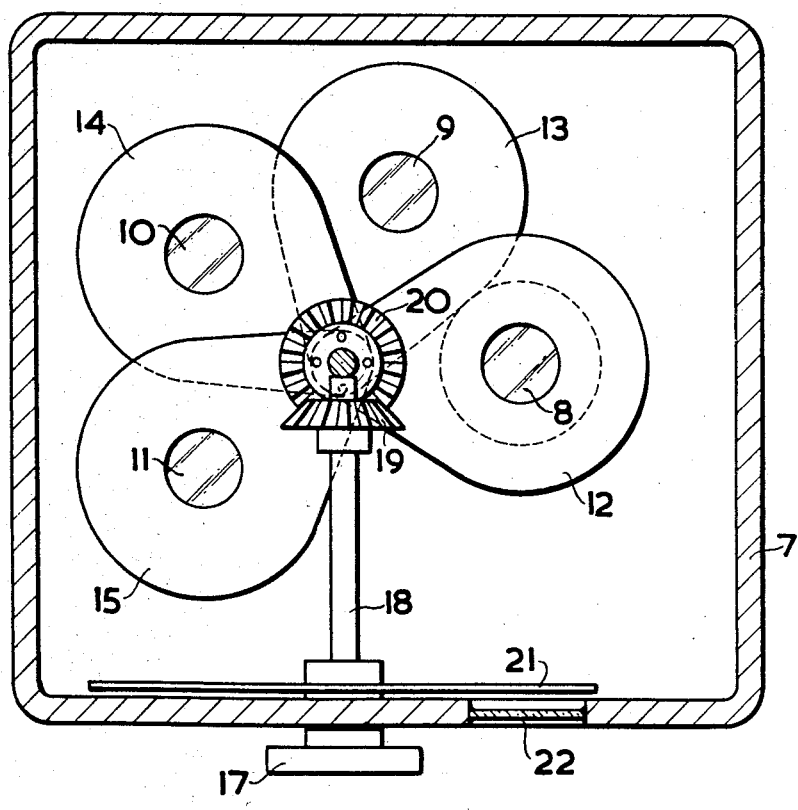
Figure 2 is a horizontal section below the shelf 3 of the apparatus shown in Figure 1.

Referring to the drawings these show a transparent container inspection apparatus in which the scanning means for generating a light-spot comprises a cathode ray tube, of which one end 2 of the envelope is shown, in which a raster is produced on the screen 1 to scan in turn all parts of a predetermined area of said screen; the optical device includes a main lens 6 which is continuously in use for all sizes of containers examined, the lens 6 conveniently forming a window in a casing 7 containing the cathode ray tube, and a number of auxiliary lenses 8, 9, 10, 11 in the casing 7 and movable so that each may be brought into the path of the light rays from the said scanned area of the screen 1 to the lens 6.

The cathode ray tube is masked by an apertured shelf 3 to the shape of the surface of the transparent container which is to be examined, in this case the bottom 4 of a milk bottle 5. Bottle 5 is supported on a plate 24 pierced in the path of the light rays emanating from screen 1 by an appropriately dimensioned aperture 25. Light rays passing through the bottom of the bottle also pass through the aperture 25 and fall upon an appropriate light-sensitive device so that any substantial variation in the output from the light sensitive device influences an appropriate device to yield an indication of contamination of the bottle.

So that the optical device will be conveniently adaptable to scanning bottles of different sizes, it is necessary that the magnification of the optical device used to image the scanning light spot area on the cathode ray tube screen upon the bottom of the bottle, shall be capable of being adjusted so that images of different diameters, each suitable to one size of bottle to be examined, may be produced. Moreover, it is necessary that the optical device shall produce images of different sizes each formed at a different distance from the lens 6 of the image forming optical device. This is necessary because it is essential that, whatever the size of the bottle being examined, its mouth shall be closely adjacent to the lens 6 in order to prevent undesirable restriction of the optical path of the light rays from the screen 1 through the bottle mouth. A satisfactory way of varying the distance of the optical device from the bottle mouth is to move the casing 7 bodily vertically as in Fig. 1 by any suitable means. The aperture of lens 6 is reduced by a diaphragm stop 23 to prevent vignetting by the bottle mouth.

In order to vary the magnification of the optical device to suit each size of bottle, lens 6 is supplemented by one or other of the auxiliary lenses 8, 9, 10 and 11. The focal lengths of these auxiliary lenses and their distances from lens 6 are so chosen that a combination of the lens 6 and an auxiliary lens forms an image of appropriate diameter at the correct distance from lens 6.

A convenient way of arranging for the auxiliary lenses to be introduced as desired into the optical path of the light rays is shown in the drawings. Each auxiliary lens 8, 9, 10, 11 is mounted in an aperture in an opaque arm in the form of a blade 12, 13, 14 or 15 respectively. These blades, which are of substantially greater diameter than the lenses and centrally apertured to receive said lenses are secured to a shaft 16 at an appropriate distance from the main lens 6 so that rotation of shaft 16 through an appropriate angle will enable any one lens 8, 9, 10 or 11 to be disposed in said optical path. Obviously it is desirable that the shaft 16 shall be provided with means for locating it in each of the appropriate positions. A spring loaded detent 16a engaging with a cam surface 16b, such as is well-known for use in a rotary switch gear, may conveniently be employed. In the embodiment of the invention shown in the drawings the shaft 16 is rotatable by means of a knob 17 outside the front of the casing 7 and fixed on a rotatable shaft 18 carrying a bevel gear 19 meshing with a similar gear 20 mounted upon the shaft 16. Conveniently the shaft 18 carries an indicator in the form of a disc 21 which exhibits through a glass window 22 in the casing 7 an indication of the size of bottle for which the optical system is adjusted.

In a particular embodiment of the present invention which was intended for the scanning of British Standard milk bottles of quart, pint, half-pint and one third-pint sizes the following dimensions were found suitable:

Diameter of aperture in mask 3_____ins__ 2.35
Distance from screen 1 to lens 6_____ins__ 8.76
Focal length of lens 6_____cms__ 16.7
Aperture of lens 6_____cms__ 3
Diameter of stop 23_____ins__ ⅝

| Bottle Size | Quart | Pint | Half-Pint | Third-Pint |
|---|---|---|---|---|
| Distance from lens 6 to bottom of bottle (ins.) | 10.31 | 8.76 | 6.62 | 5.45 |
| Diameter of bottle bottom (ins.) | 3.05 | 2.35 | 1.9 | 1.7 |
| Distance of auxiliary lens from tube screen (ins.) | 7.05 | 8.7 | 8.2 | 7.9 |
| Focal length of auxiliary lens (cms.) | 32 | 33 | 21 | 16 |

It will be appreciated that photoelectric inspection apparatus according to the invention provides a very simple and convenient optical system which by suitable choice of lenses may be arranged to image a scanned area upon surfaces of quite widely differing areas and differing distances from the nearest component of the optical device. The invention is of course not limited to the specific embodiment described since the mechanical arrangements employed for changing the lens may very readily be replaced by other equivalent arrangements and the lens powers and distances would be selected to suit any particular requirements and the invention is not limited to the numerical values given.

I claim:

1. A photoelectric inspection apparatus for examining transparent containers having open mouths comprising means for generating and moving a light beam to scan the total area of the container bottom, an optical device for focusing the light beam through the open mouth and on the transparent bottom of the container, a light sensitive device disposed to intercept the light beam passing axially through said container and the transparent bottom thereof, said optical device including a first lens disposed closely adjacent the open mouth of the container so that the focused light beam passes through the container bottom only, whereby the light beam passing through the bottom is free from distortion from the container sides, and a plurality of auxiliary lenses each arranged to be selectively introduced into the light beam path so that the size of the focused beam image and its distance from said first lens may be varied in accordance with the size of the container to be examined.

2. A photoelectric inspection apparatus according to claim 1 comprising a casing in which said optical system and light beam generating means are disposed, said casing defining an aperture in which said first lens is disposed whereby all the light emanating from said lens is directed through the mouth of the container and the presence of stray light is eliminated.

3. A photoelectric inspection apparatus according to claim 1 in which a diaphragm stop is associated with said first lens.

4. A photoelectric inspection apparatus according to claim 1 comprising a plurality of movably mounted blades having apertures therein which accommodate said auxiliary lenses.

5. A photoelectric inspection apparatus according to claim 4 wherein said blades are mounted on and project radially from a shaft parallel to the optical axis of said path of said light rays.

6. A photoelectric inspection apparatus according to claim 5 in which said shaft is located in each of a plurality of positions in which one of said auxiliary lenses is centered in the axis of said path by a spring-loaded detent engaging with a cam surface.

7. A photoelectric inspection apparatus according to claim 4 in which there is provided an index visible through a window in said casing and indicative of the auxiliary lens which is at any time in position in said path of light rays.

8. A photoelectric inspection apparatus for examining transparent containers, comprising scanning means for generating a light spot moving to scan all parts in turn of a predetermined area, an apertured support for a container to be examined, a first lens fixed in the path of light rays from said area through said container, a plurality of arms each having an aperture therein and in the form of an opaque blade, said blades being movably mounted so that their apertures can be introduced selectively into said path of said light rays, an auxiliary lens disposed in each said blade aperture, a light sensitive device disposed to receive said light rays passing through said aperture support, and means for moving said scanning means, said first lens and said auxiliary lenses as a whole in the direction of said light rays to bring said images formed by said lenses disposed in said path at varying distances from said first lens into a predetermined plane.

References Cited in the file of this patent

UNITED STATES PATENTS

| | | |
|---|---|---|
| 2,696,755 | Frischmann | Dec. 14, 1954 |
| 2,750,519 | Summerhayes et al. | June 12, 1956 |
| 2,791,937 | Leitz et al. | May 14, 1957 |